United States Patent
Ghinamo et al.

(10) Patent No.: US 12,323,824 B2
(45) Date of Patent: Jun. 3, 2025

(54) METHOD FOR DEACTIVATING A CELL SITE IN A CELLULAR COMMUNICATION SYSTEM

(71) Applicant: TELECOM ITALIA S.p.A., Milan (IT)

(72) Inventors: Giorgio Ghinamo, Turin (IT); Gianpiero Galati, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 450 days.

(21) Appl. No.: 17/783,549

(22) PCT Filed: Dec. 21, 2020

(86) PCT No.: PCT/EP2020/087394
§ 371 (c)(1),
(2) Date: Jun. 8, 2022

(87) PCT Pub. No.: WO2021/130152
PCT Pub. Date: Jul. 1, 2021

(65) Prior Publication Data
US 2023/0009705 A1 Jan. 12, 2023

(30) Foreign Application Priority Data
Dec. 27, 2019 (IT) .......................... 102019000025624

(51) Int. Cl.
*H04W 24/02* (2009.01)
*H04W 84/18* (2009.01)

(52) U.S. Cl.
CPC ............ *H04W 24/02* (2013.01); *H04W 84/18* (2013.01)

(58) Field of Classification Search
None
See application file for complete search history.

(56) References Cited

U.S. PATENT DOCUMENTS

2013/0150044 A1 6/2013 Zhang et al.
2014/0050135 A1 2/2014 Zhang et al.
(Continued)

FOREIGN PATENT DOCUMENTS

EP 2 566 258 A1 3/2013
EP 2 975 886 A1 1/2016
EP 3 065 438 A1 9/2016

OTHER PUBLICATIONS

International Search Report and Written Opinion issued Mar. 12, 2021, in PCT/EP2020/087394 filed Dec. 21, 2020, 16 pages.
(Continued)

*Primary Examiner* — Frantz Bataille
(74) *Attorney, Agent, or Firm* — Oblon, McClelland, Maier & Neustadt, L.L.P.

(57) ABSTRACT

A cellular system includes cell sites, each having multiple cells. Each cell identifies a radio coverage area and includes communication equipment. A method for managing the cellular system includes determining, among the cell sites, a candidate cell site to be at least partially deactivated. The candidate cell includes at least one associated cell with a load factor below a threshold. Replacement cells are selected from other cell sites, where the replacement cells are adjacent to the candidate cell. A target geographical area enclosing the area of the candidate cell and that of the replacement cells is identified, and a transmission parameter for the target geographical area is determined. Communication equipment associated with the replacement cells is selected and configured based on the transmission parameter. Then the candidate cell monitors the transmission parameter in the target geographic area, and at least partially deactivates based on the monitoring.

11 Claims, 2 Drawing Sheets

(56) References Cited

U.S. PATENT DOCUMENTS

Figure 1:
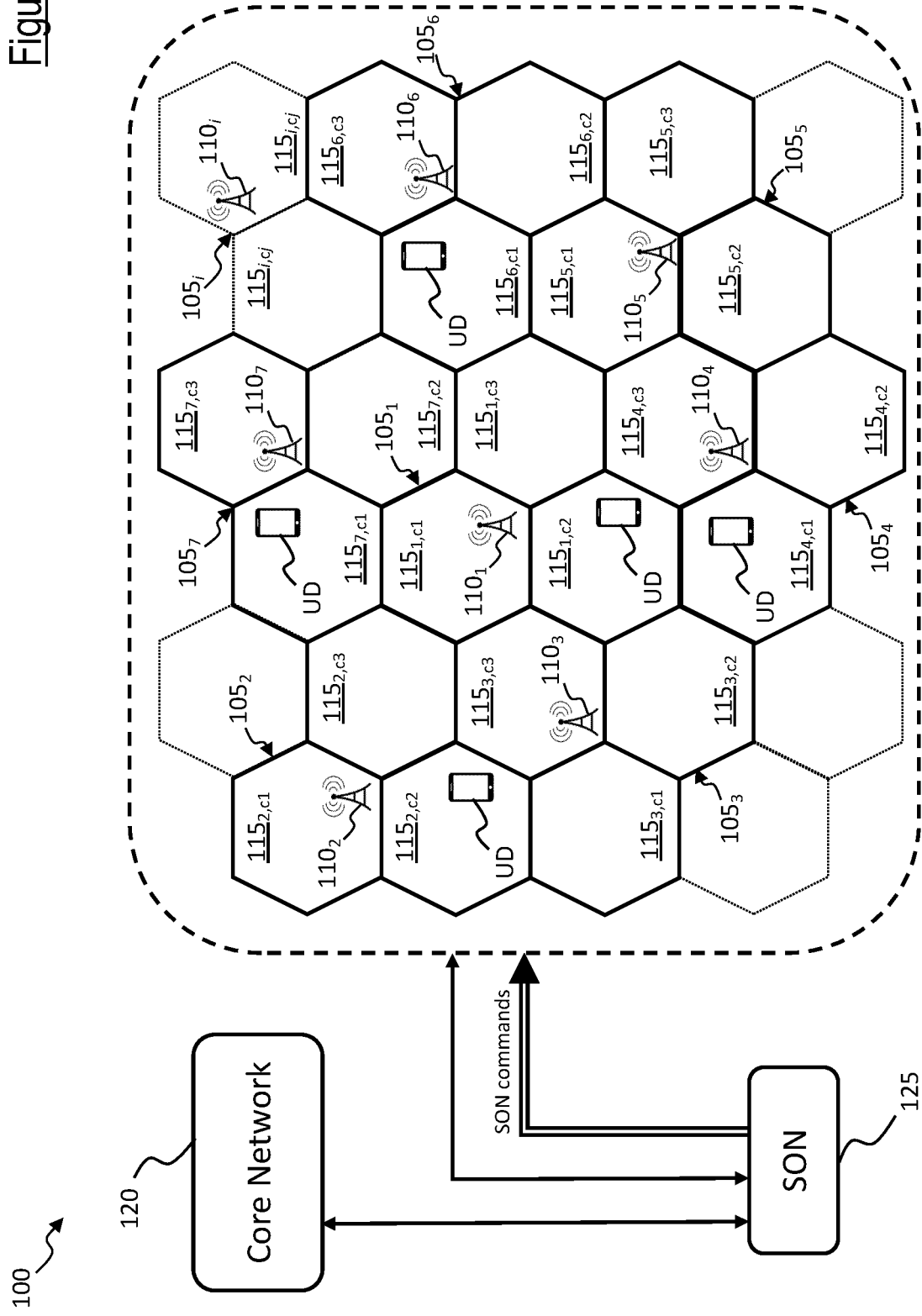

| | | | |
|---|---|---|---|
| 2015/0296429 A1* | 10/2015 | Kilgour | H04W 36/0085 |
| | | | 455/434 |
| 2016/0014661 A1 | 1/2016 | Choi et al. | |
| 2016/0255580 A1 | 9/2016 | Onaka et al. | |
| 2018/0184369 A1 | 6/2018 | Onaka et al. | |
| 2019/0306791 A1 | 10/2019 | Onaka et al. | |
| 2020/0092940 A1* | 3/2020 | Qin | H04W 76/15 |

OTHER PUBLICATIONS

"3rd Generation Partnership Project; Technical Specification Group Services and System Aspects; Telecommunication management; Energy Saving Management (ESM); Concepts and requirements (Release 15)", 3GPP TS 32.551 V15.0.0, Jun. 2018, 14 pages.

* cited by examiner

METHOD FOR DEACTIVATING A CELL SITE IN A CELLULAR COMMUNICATION SYSTEM

BACKGROUND OF THE INVENTION

Field of the Invention

The present invention generally relates to cellular communication systems, such as 3G, LTE/LTE-Advanced and 5G cellular communication systems. Particularly, the present invention relates to a method for safely deactivating a cell site within such cellular communication systems.

Overview of the Related Art

Cellular communication systems (e.g., 3G, LTE/LTE-Advanced and 5G cellular communication systems) allow data traffic to be high-speed conveyed between a fixed-location cellular communication equipment (or transceiver base station) radiating radio waves over a geographic area, and user equipment (e.g., user terminals, such as mobile phones) within it.

According to a common implementation, each cellular communication equipment identifies a respective cell site, or cell tower, i.e. a site where the cellular communication equipment (including, inter alia, one or more antennas and one or more electronic apparatuses such as transceivers and digital signal processors) is placed (typically on a radio mast, tower, or other raised structure) to define a plurality of (typically, three) radio coverage geographic areas (cells or sectors) of a cellular network.

As known, it could be desired to deactivate a cell site of a cellular communication system, such as in response to a low, or relatively low, data traffic disposed by it.

Recently, cellular communication systems have been provided with "*Self-Organizing Network*" (SON) functionalities, i.e. functionalities that allow setting or tuning or adjusting one or more parameters of the cellular network (such as transmitted power, antenna electrical tilt, adjacency relationships between neighboring cells, handover thresholds, and antenna radiation pattern).

The following solutions exist that disclose cell deactivation by exploiting the SON functionalities.

U.S. Pat. No. 8,861,494 discloses an apparatus configured to support a self-optimizing network (SON) comprising a wireless access node. The apparatus includes a processor and a memory communicatively connected to the processor. The processor is configured to perform a self-configuration function to automatically configure the wireless access node for operation within the SON, perform a physical cell identifier (PCI) configuration function configured to assign a PCI to the wireless access node, and perform a neighbor relationship management function configured to determine at least one neighbor wireless access node for inclusion in a neighbor list of the wireless access node.

Joyce R. and Zhang LI, "*Self-Organizing Network Techniques to Maximize Traffic Offload onto a 3G/WCDMA Small Cell Network using MDT UE Measurement Reports*", Global Communications Conference (GLOBECOM), 2014 IEEE, 8-12 December 2014, Austin, TX, USA, discloses a number of Self-Organizing Network (SON) based methods using a 3GPP Minimization of Drive Testing (MDT) approach or similar and the analysis of these geo-located UE measurements to maximize traffic offload onto lamppost mounted 3G/WCDMA microcells.

SUMMARY OF INVENTION

The Applicant has recognized that none of the cited prior art solutions is satisfactory, for the following reasons.

The solution disclosed in U.S. Pat. No. 8,861,494 is aimed at a cellular network reconfiguration addressing energy consumption and interference issues, and deactivation of a cell site is merely cited as a possibility to this purpose.

As far as the solution disclosed in "*Self-Organizing Network Techniques to Maximize Traffic Offload onto a 3G/WCDMA Small Cell Network using MDT UE Measurement Reports*", the Applicant has understood that such a solution lends itself to issues arising immediately upon deactivation of a cell. Indeed, according to such a solution the radio coverage geographic area defined by the cell to be deactivated (and, hence, the data traffic disposed by it) is progressively reduced, until the disposed data traffic is low enough that it is possible to deactivate the cell. However, the progressive power decrease to obtain the radio coverage geographic area reduction may generate undetectable radio coverage holes, or at least unsatisfactory levels of field or interference in geographical areas too wide compared to cell coverage.

In view of the above, the Applicant has tackled the above mentioned issues, and has devised a method for safely deactivating a cell site without generating radio coverage holes in the cellular network.

One or more aspects of the solution according to specific embodiments of the invention are set out in the independent claims, with advantageous features of the same solution that are indicated in the dependent claims, whose wording is enclosed herein verbatim by reference (with any advantageous feature being provided with reference to a specific aspect of the solution according to an embodiment of the invention that applies mutatis mutandis to any other aspect).

More specifically, an aspect of the present invention relates to a method for managing a cellular communication system. The cellular communication system comprises a plurality of cell sites each one associated with a plurality of cells. Each cell identifies a respective radio coverage geographic area. Each cell site comprises a cellular communication equipment associated with the plurality of cells of said cell site. The method comprises one or more among the following steps:

(i) among said plurality of cell sites, determining a candidate cell site to be at least partially deactivated. Said candidate cell site is a cell site associated with at least one candidate cell to be deactivated. The at least one candidate cell comprises at least one cell of the plurality of cells associated with the candidate cell site with a load factor below a threshold load factor;

(ii) selecting, among the plurality of cells associated with the plurality of cell sites other than the candidate cell site, replacement cells intended to replace the at least one candidate cell upon deactivation thereof. The replacement cells are adjacent to the at least one candidate cell;

(iii) determining a target geographic area. The target geographic area encloses at least the geographic areas identified by the at least one candidate cell and the geographic areas identified by the replacement cells;

(iv) estimating at least one radio transmission parameter in the target geographic area as a function of a cell configuration of each cellular communication equipment associated with the replacement cells, assuming that the candidate site is at least partially deactivated;

(v) based on said estimated at least one radio transmission parameter, selecting, for the cellular communication equipment associated with the adjacent cells, respective replacement cell configurations;

(vi) setting each cellular communication equipment associated with the adjacent cells at the respective replacement cell configuration;

(vii) causing the at least one candidate cell to monitor said at least one radio transmission parameter in the target geographic area, and (viii) if the monitored at least one radio transmission parameter approaches at least by a predefined amount the at least one radio transmission parameter estimated for the respective replacement cell configurations, deactivating at least partially the candidate cell site by deactivating the at least one candidate cell of said candidate cell site.

According to an embodiment, additional or alternative to any of the previous embodiments, step (vii) comprises causing the at least one candidate cell to monitor said at least one radio transmission parameter in the target geographic area while keeping on disposing data traffic to/from user equipment within the radio coverage geographic areas identified by the at least one candidate cell.

According to an embodiment, additional or alternative to any of the previous embodiments, steps (vi) and (vii) are performed while keeping unchanged a current configuration of the cellular communication equipment associated with the at least one candidate cell.

According to an embodiment, additional or alternative to any of the previous embodiments, step (vii) further comprises mitigating inter-cell interference between the at least one candidate cell and the replacement cells.

According to an embodiment, additional or alternative to any of the previous embodiments, the method further comprises, if the monitored at least one radio transmission parameter does not approach at least by the predefined amount the at least one radio transmission parameter estimated for the respective replacement cell configurations, repeating steps (v) to (viii).

According to an embodiment, additional or alternative to any of the previous embodiments, said at least one radio transmission parameter comprises:
 a signal to interference plus noise ratio, or
 a user throughput, or
 a transmission power of the cellular communication equipment associated with the at least one candidate cell and a transmission power of the cellular communication equipment associated with the replacement cells.

According to an embodiment, additional or alternative to any of the previous embodiments, said at least one radio transmission parameter comprises:
 a predefined percentile of a cumulative distribution function of the signal to interference plus noise ratio associated with the replacement cells, or
 a predefined percentile of a cumulative distribution function of the user throughput associated with the users within the replacement cells, or
 a predefined percentile of a cumulative distribution of the transmission power of the cellular communication equipment associated with the at least one candidate cell and a predefined percentile of cumulative distribution of the transmission power of the cellular communication equipment associated with the replacement cells.

According to an embodiment, additional or alternative to any of the previous embodiments, step (vi) is performed through self-organizing network functionalities of the cellular communication system.

According to an embodiment, additional or alternative to any of the previous embodiments, step (vii) is based on at least one between:
 procedure and/or event traces, preferably geo-localized procedure and/or geo-localized event traces, collected by network elements of the cellular communication system, and
 radio measurements, preferably geo-localized radio measurements, reported through Minimization of Drive Test functionality by one or more user devices connected to the cellular communication system.

According to an embodiment, additional or alternative to any of the previous embodiments, each cellular communication equipment comprises at least one antenna, and wherein the replacement cell configuration comprises at least one antenna parameter of the cellular communication equipment associated with the replacement cells. Said at least one antenna parameter comprises at least one among transmitted power, antenna electrical tilt, gain and antenna radiation pattern of said at least one antenna.

Another aspect of the present invention relates to a cellular communication system configured to perform the method of above.

BRIEF DESCRIPTION OF THE ANNEXED DRAWINGS

Figure 2:
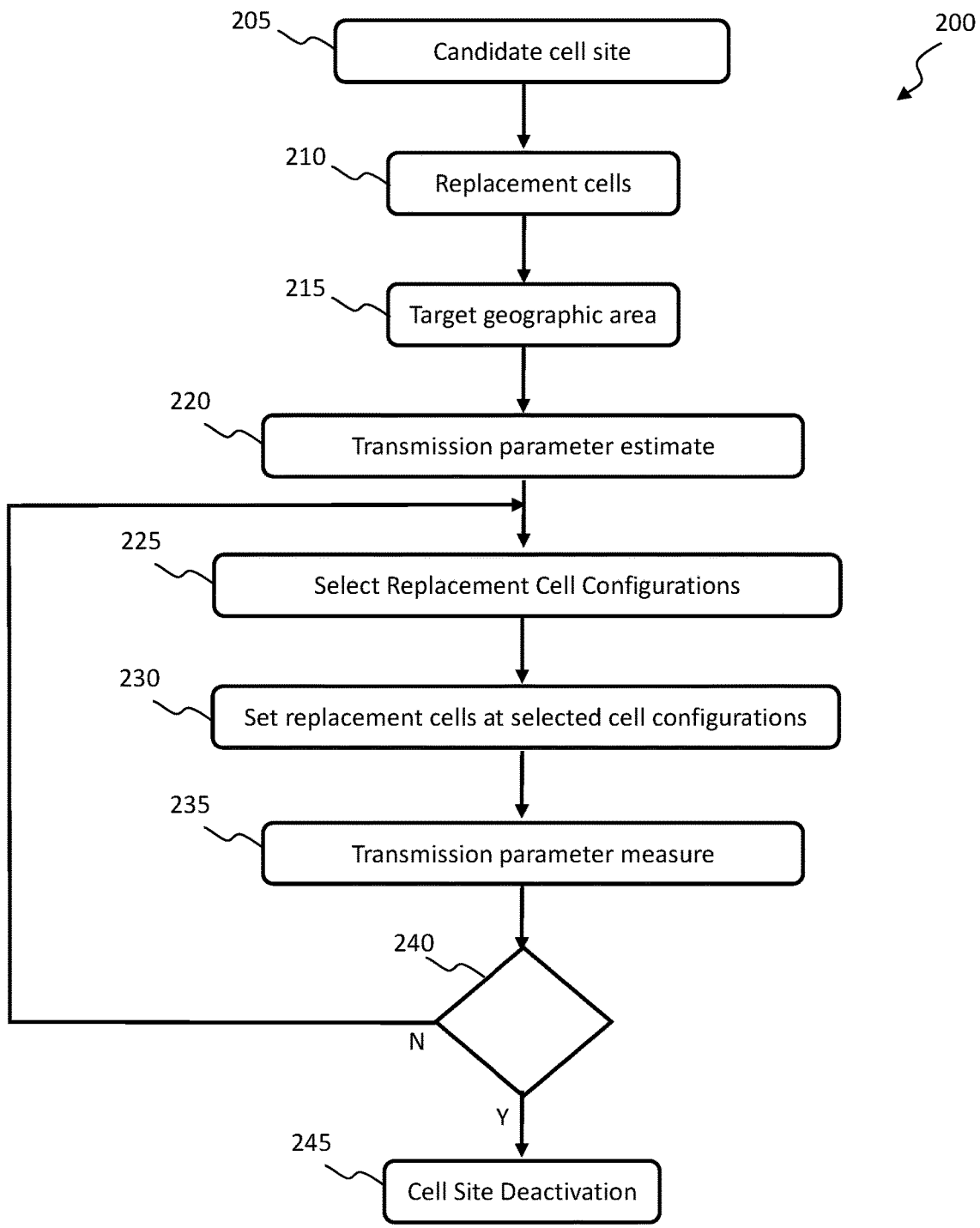

These and other features and advantages of the invention will be made apparent by the following description of some exemplary and non-limitative embodiments thereof. For its better intelligibility, the following description should be read making reference to the attached drawings, wherein:

FIG. 1 schematically shows a portion of a cellular communication system wherein the present invention may be applied, and FIG. 2 schematically shows an activity flow of a method adapted to be used in the cellular communication system, according to an embodiment of the invention.

DETAILED DESCRIPTION OF PREFERRED EMBODIMENTS OF THE INVENTION

With reference to the drawings, a portion of a cellular communication system 100 according to an embodiment of the present invention is schematically illustrated in FIG. 1.

In the following, when one or more features of the cellular communication system 100 (and of a method implemented by it) are introduced by the wording "according to an embodiment", they are to be construed as features additional or alternative to any features previously introduced, unless otherwise indicated and/or unless evident incompatibility among feature combinations that is immediately apparent to the person skilled in the art.

The cellular communication system 100 comprises a plurality I of cell sites $105_i$ (i=1,2,3,4, . . . I, with I=7 in the example at issue).

By cell site, or cell tower, it is herein meant a site where one or more antennas and one or more electronic apparatuses (including, for example, transceivers and digital signal processors) are placed (typically on a radio mast, tower, or other raised structure) to define one or more radio coverage geographic areas (cells or sectors) of a cellular network.

In the following, the antenna(s) and the electronic apparatus(es) of a respective cell site will be referred to globally as cellular communication equipment when distinguishing between them is deemed not relevant to the understanding of the present invention.

According to an embodiment, each cell site $105_i$ comprises a cellular communication equipment $110_i$.

According to an embodiment, each cell site $105_i$, and the corresponding cellular communication equipment $110_i$, is associated with a plurality J of cells $115_i,c_j$ (j=1, 2, ..., J). In the exemplary considered embodiment, each cell site $105_i$ is associated with three cells $115_i,c_j$ (i.e., J=3), although this should not be construed limitatively.

Just as an example, the cell site $105_1$ is associated with the cells $115_1,c_1$, $115_1,c_2$, $115_1,c_3$, the cell site $105_2$ is associated with the cells $115_2,c_1$, $115_2,c_2$, $115_2,c_3$, the cell site $105_3$ is associated with the cells $115_3,c_1$, $115_3,c_2$, $115_3,c_3$, the cell site $105_4$ is associated with the cells $115_4,c_1$, $115_4,c_2$, $115_4,c_3$, the cell site $105_5$ is associated with the cells $115_5,c_1$, $115_5,c_2$, $115_5,c_3$, the cell site $105_6$ is associated with the cells $115_6,c_1$, $115_6,c_2$, $115_6,c_3$, and the cell site $105_7$ is associated with the cells $115_7,c_1$, $115_7,c_2$, $115_7,c_3$.

According to an embodiment, as exemplary illustrated, the radio coverage geographic area identified by each cell $115_i,c_j$ is hexagonal in shape.

According to an embodiment, as exemplary illustrated, the cellular communication equipment $110_i$ associated with each cell site $105_i$ is located at a common vertex of the three hexagons representing the respective cells $115_i,c_j$ although this should not be construed limitatively.

In the following, the plurality I of cell sites $105_i$, the plurality I of cellular communication equipment $110_i$, and the plurality J*I of cells $115_i,c_j$ will be globally referred to also as cellular network.

According to an embodiment, each cell site $105_i$ allows user devices UD within the respective cells $115_i,c_j$ and connecting/connected to the cellular communication system 100, to exchange data traffic (e.g., web browsing, e-mailing, voice, or multimedia data traffic), hereinafter traffic load. Examples of user devices UD comprise, but are not limited to, mobile phones, smartphones, tablets, personal digital assistants and computers.

For the purposes of the present disclosure, data traffic exchange includes both exchange of information data (i.e., user data or payload) and exchange of data other than information data (hereinafter referred to as control data). Examples of control data include, but are not limited to, pilot symbols, synchronization signals, reference signals and broadcast signaling.

According to an embodiment, the cellular network forms the radio access network.

The radio access network (and, more generally, the cellular communication system 100) may be based on any suitable radio access technology.

For the purposes of the present disclosure, the radio access network (and, more generally, the cellular communication system 100) is based on any suitable radio access technology wherein, at each cell $115_i,c_j$ information data exchange takes place by exploiting, among the overall frequencies which the cellular communication system 100 is designed to operate with, all the frequencies reserved for information data exchange (i.e. by excluding, from the overall frequencies, only those frequencies possibly reserved for control data exchange): examples of such radio access technologies comprise UTRA ("*UMTS Terrestrial Radio Access*"), WCDMA ("*Wideband Code Division Multiple Access*"), CDMA2000, LTE ("*Long Term Evolution*"), LTE-Advanced, and NR ("*New Radio*").

According to an embodiment, the radio access network is communicably coupled with one or more core networks, such as the core network 120. The core network 120 may be any type of network configured to provide aggregation, authentication, call control/switching, charging, service invocation, gateway and subscriber database functionalities, or at least a subset (i.e., one or more) thereof.

According to an embodiment, the core network 120 comprises a 4G/LTE core network or a 5G core network.

According to an embodiment, the core network 120 is communicably coupled with other networks, such as the Internet and/or public switched telephone networks (not shown).

According to an embodiment, the cellular communication system 100 is provided with "Self-Organizing Network" (SON) functionalities, i.e. functionalities that allow setting or tuning or adjusting one or more parameters (hereinafter, SON parameters) of the cellular network.

Examples of SON parameters comprise, but are not limited to, adjacency relationships between neighboring cells, handover thresholds, and one or more antenna parameters. Examples of antenna parameters include, but are not limited to, transmitted power, antenna electrical tilt, gain and antenna radiation pattern (e.g. pointing direction, directivity and width of one or more lobes of the pattern of lobes exhibited by the radiation pattern of the antenna).

According to an embodiment, the cellular communication system 100 comprises a SON module 125, i.e. a processing module that allows implementing the SON functionalities. The SON module 125 may be implemented by software, hardware, and/or a combination thereof.

According to an embodiment, the SON module 125 is located external to both the cellular network and the core network 120. According to an alternative embodiment, the SON module 125 is located in the core network 115 (e.g., in one or more modules thereof) or in any other entity of the cellular network or of the cellular communication system 100. According to an embodiment, the physical location of the SON module 125 depends on the implemented SON network architecture (e.g., distributed SON network, centralized SON network or hybrid SON network).

According to an embodiment, the SON module 125 is configured to perform a method for safely deactivating a cell site.

In the following, by deactivation of a cell site $105_i$ it is herein meant the temporary or permanent switching-off/turning-off/disabling of the cellular communication equipment $110_i$ associated with that cell site. Similarly, by deactivation of one or more cells $105_{i,cj}$ associated with a cell site $105_i$ it is herein meant the reconfiguration/setting of the respective cellular communication equipment $110_i$ aimed at temporarily or permanently switching-off, cancelling/abolishing these one or more cells $105_{i,cj}$.

By safe deactivation of a cell site it is herein meant a deactivation of a cell site $105_i$, and hence of the respective cells $105_{i,cj}$, that can be completely (or substantially completely) compensated, at least in terms of radio coverage geographic area, by one or more adjacent cells. In other words, by safe deactivation of a cell site it is herein meant a deactivation of a cell site $105_i$, and hence of the respective cells $105_{i,cj}$ such that one or more adjacent cells (i.e., cells adjacent to the cells $105_{i,cj}$ of that cell site $105_i$) can replace or substitute that cell site $105_i$ in disposing data traffic to/from user devices UD within it: in the following, the adjacent cells intended to replace a cell site $105_i$ will be referred to as replacement cells.

According to an embodiment, replacement of a deactivated cell site by selected replacement cells is based on reconfigurations of the selected replacement cells.

According to an embodiment, as better discussed in the following, cell site deactivations and replacement cell reconfigurations are performed by setting or tuning or adjusting corresponding SON parameters of the cellular network. According to an embodiment, the SON parameters of the cellular network are set or tuned or adjusted through proper commands, hereinafter referred to as SON commands, from the SON module 125 to the cellular network.

According to an embodiment, as better discussed in the following, the method performed by the SON module 125 for safely deactivating a cell site is based on estimates and measurements of one or more radio transmission parameters of the cellular network.

According to an embodiment, such estimates and measurements of the radio transmission parameter(s) are performed and/or collected by the SON module 125 (i.e., such estimates and measurements of the radio transmission parameter(s), or at least a subset thereof, may be performed completely by the SON module 125 or by any other entities of the cellular communication system 100 and collected by the SON module 125). According to an embodiment, such estimates and measurements of the radio transmission parameter(s) are performed and/or collected by the SON module 125 based on proper signalling exchange with the cellular network (and/or with the user devices UD connected thereto, as better discussed in the following) and/or with the core network 120 (this is conceptually represented in the figure by a double-headed arrow between the SON module 125 and the radio access network, and a double-headed arrow between the SON module 125 and the core network 120).

According to an embodiment, such estimates and measurements of the radio transmission parameter(s) comprise estimates and measurements at predetermined points or locations geographically distributed in a target geographic area (discussed here below).

With reference now to FIG. 2, it schematically shows an activity diagram of a method 200 for safely deactivating a cell site, according to an embodiment of the present invention.

In its general terms, the method 200 for safely deactivating a cell site according to a preferred embodiment of the present invention comprises estimating, in a target geographic area enclosing the geographic areas identified by candidate cells to be deactivated and the geographic areas identified by replacement cells intended to replace the candidate cells, one or more radio transmission parameters assuming that the candidate site is deactivated, setting the replacement cells at replacement cell configurations that, based on the radio transmission parameters, maximize a suitable cost function, causing the candidate cells to monitor the radio transmission parameter(s) while keeping on serving users devices within the respective geographic areas (thus, without causing disservices to the users during monitoring), and deactivating the candidate cell site only if the monitored radio transmission parameter(s) approach the estimated radio transmission parameter(s).

According to an embodiment, the method 200 is implemented by the SON module 125. However, this should not be construed limitatively: in fact, according to an embodiment, at least a subset of the method steps may for example be implemented by the core network 120, and/or by one or more other entities or modules (not shown) of the cellular communication system 100.

According to an embodiment, the method 200 comprises determining a candidate cell site to be deactivated among the plurality I of cell sites $105_i$ of the cellular communication system 100 (action node 205).

According to an embodiment, the candidate cell site is a cell site $105_i$ associated with a low, or relatively low, load factor, for example a load factor below a threshold load factor.

By cell site associated with a low, or relatively low, load factor it is herein meant a cell site whose disposed data traffic corresponds to a low, or relatively low, degree of occupation of radio resources (e.g., from 10% to 35%, such as 15%) as compared to the radio resources available as a whole at that cell site.

According to an embodiment, the load factor associated with a cell site is computed according to the load factor associated with each cell belonging to that cell site. Just as an example, the load factor associated with a cell site may be computed as the average of the load factors associated with the cells belonging to that cell site.

According to an embodiment, the candidate cell site is a cell site $105_i$ associated with a low, or relatively low, load factor in one or more periods of the year, such as in one or more seasons, and/or in one or more months, and/or in one or more daily time slots.

According to an embodiment, the candidate cell site is a cell site $105_i$ associated with a low, or relatively low, load factor in one or more periods of the year, and is located in a geographic area in which the respective adjacent cell sites also experience a low, or relatively low, load factor at least in the same (or substantially the same) period(s) of the year.

In the following, for ease of description, each cell $115_{i,cj}$ of the plurality of cells associated with the candidate cell site $105_i$ will be referred to as a candidate cell.

According to an embodiment, the method 200 comprises selecting, among the plurality of cells $115_{i,cj}$ associated with the plurality of cell sites other than the candidate cell site $105_i$, replacement cells adapted to replace the candidate cells upon deactivation of the candidate cell site (action node 210).

According to an embodiment, the replacement cells are, among the plurality of cells associated with the plurality of cell sites, the cells being adjacent to the candidate cells of the candidate cell site $105_i$. Otherwise stated, at action node 210, for each candidate cell of the candidate cell site, two or more replacement cells adjacent to that candidate cell are selected (with the replacement cells that may be associated with same or different cell sites in the neighborhood of the candidate cell site).

Just as an example, assuming that the candidate cell site is the cell site $105_1$, the replacement cells comprise one or more among the cells $115_{2,c3}$, $115_{3,c3}$, $115_{7,c3}$, $115_{7,c2}$ (which are all adjacent to the cell $115_{1,c1}$), one or more among the cells $115_{3,c3}$, $115_{3,c2}$, $115_{4,c1}$, $115_{4,c3}$ (which are all adjacent to the cell $115_{1,c2}$), and one or more among the cells $115_{4,c3}$, $115_{5,c1}$, $115_{6,c1}$, $115_{7,c2}$ (which are all adjacent to the cell $115_{1,c3}$).

According to an embodiment, a number of replacement cells below a predetermined number (e.g., 20) are selected at action node 210.

According to an embodiment, a number of replacement cells below a further predetermined number (e.g., 4) are selected for each candidate cell at action node 210.

According to an embodiment, the replacement cells are selected according to the respective load factors: just as an example, for each candidate cell $115_{i,cj}$, the respective replacement cells are selected as the adjacent cells having the lowest load factors in same or similar periods of the year.

According to an embodiment, the method 200 comprises determining a target geographic area (action node 215). According to an embodiment, the target geographic area encloses at least the geographic areas identified by the candidate cells and the geographic areas identified by the replacement cells—as will be discussed in the following, the target geographic area comprises the geographic area intended to be covered (i.e., served) by the replacement cells upon deactivation of the candidate cell site $105_i$.

According to an embodiment, the method 200 comprises estimating (action node 220) one or more radio transmission parameters in the target geographic area as a function of a configuration of each cellular communication equipment associated with the replacement cells (hereinafter referred to as replacement cell configuration), assuming that the candidate site is deactivated. In other words, at action node 220 the method comprises estimating one or more radio transmission parameters as the replacement cell configurations vary.

Practically, according to an embodiment, the radio transmission parameter estimate(s) are determined for each, or for at least a number of, combinations of replacement cell configurations, whereby for each combination of replacement cell configurations the radio transmission parameter estimate(s) can be determined.

The radio transmission parameter(s) estimated at action node 220 will be referred to as radio transmission parameter estimate(s) in the following.

According to an embodiment, the replacement cell configuration comprises at least one antenna parameter of the cellular communication equipment associated with the replacement cells, such as transmitted power, antenna electrical tilt, gain and antenna radiation pattern.

According to an embodiment, the estimate of the radio transmission parameter(s) for each replacement cell configuration may be preliminarily achieved analytically by using electromagnetic simulators based on morphological information of the target geographic area, which make an a priori estimate of the effects that the change in the replacement cell configurations have on the coverage. An example of electromagnetic simulator is disclosed in Hata, M. "*Empirical Formula for Propagation Loss in Land Mobile Radio Services*", IEEE Transactions on Vehicular Technology, August 1980, VT-29 (3): 317-325.

According to an embodiment, the radio transmission parameter(s) are estimated on different portions (or test portion) of the target geographic area.

According to an embodiment, the radio transmission parameter(s) comprise a signal to interference plus noise ratio, namely the ratio between the signal radiated for delivering a service after the candidate cell site $105_i$ has been deactivated and the sum of the noise plus the interfering signals originated by the replacement cells while delivering services (i.e., disposing traffic load) in place of the candidate cells.

According to an embodiment, plural signal to interference plus noise ratio estimates are used to determine a value of a respective cost function.

Just as an example, the cost function may be the following:

$$FC = p*SNIR_{50\%} + (1-p)*SNIR_{5\%}$$

wherein:
$SNIR_{50\%}$ represents the 50th percentile of the cumulative distribution function of the signal to noise plus interference ratio associated with the replacement cells;
$SNIR_{5\%}$ represents the 5th percentile of the cumulative distribution function of the signal to noise plus interference ratio associated with the replacement cells, and
p and (1-p) are weighting factors associated with the $SNIR_{50\%}$ and $SNIR_{5\%}$ parameters, respectively, where $0 \le p \le 1$.

According to an alternative embodiment, the radio transmission parameter(s) comprise a user throughput estimate (namely an estimate of the amount of data being exchanged by a user on average) associated with the replacement cells (i.e., in the target geographic area after the candidate cell site $105_i$ has been deactivated).

According to an embodiment, plural user throughput estimates are used to determine a value of a respective cost function.

Just as an example, the cost function may be the following:

$$FC = p*THR_{50\%} + (1-p)*THR_{5\%}$$

$THR_{50\%}$ represents the 50th percentile of the cumulative distribution function of the user throughput estimates associated with the replacement cells (or otherwise stated, the throughputs estimated for users within the target geographic area after the candidate cell site $105_i$ has been deactivated);
$THR_{5\%}$ represents the 5th percentile of the cumulative distribution function of the user throughput estimates associated with the replacement cells (or otherwise stated, the throughputs estimated for users within the target geographic area after the candidate cell site $105_i$ has been deactivated), and
p and (1-p) are weighting factors associated with the $THR_{50\%}$ and $THR_{50\%}$ parameters, respectively, where $0 \le p \le 1$.

According to an embodiment, user throughput associated with the replacement cells is estimated as follows:
each user within the target geographic area (i.e., within both the candidate cells and the replacement cells) is assumed to be assigned a respective amount of radio resources based on a proper radio resource assigning algorithm. An example of radio resource assigning algorithm is the fair scheduling algorithm (as disclosed, for example, in S Berger, A Fehske, P Zanier, I. Viering "*Comparing Online and Offline SON Solutions for Concurrent Capacity and Coverage Optimization*", 80th Vehicular Technology Conference Fall 2014, September 2014"), which operates by assigning the same amount of radio resources to each user;
based on an estimated or measured number of users within the target geographic area, the user throughput in the target geographic is estimated, for each user, based on the amount of radio resources assigned to that users and based on the distribution function of the signal to noise plus interference ratio (i.e. the radio resources actually exploited by each user may be lower than the amount of radio resources assigned thereto due to the signal to noise plus interference ratio estimated to be experienced by that user); and
the user throughput associated with the replacement cells is estimated, for each replacement cell, by summing, to the (current) number of users falling within that replacement cell, the percentage of users previously falling within the candidate cells and subsequently falling within that replacement cell after deactivation of the candidate cell site $105_i$. According to an embodiment, the number of users previously falling within the candidate cells is apportioned among the replacement cells according to a redistribution (if any) of the users among the replacement cells (e.g., due to a change in the geographic area identified by the replacement cells as a result of the reconfigurations of the selected replacement cells).

According to an alternative embodiment, the radio transmission parameter(s) comprise a transmission power of the cellular communication equipment associated with the candidate cells $105_{AA}$ and a transmission power of the cellular communication equipment associated with the replacement cells.

According to an embodiment, plural transmission power estimates are used to determine a value of a respective cost function.

Just as an example, the cost function may be the following:

$$FC = p * \Delta PW_{\%} + (1-p) * \Delta PW_{mean}$$

wherein:
$\Delta PW_{\%}$ represents a predefined percentile (for example, the 5th or 10th percentile) of the cumulative distribution function of the difference between the power of the candidate cells and the power of the replacement cells;
$\Delta PW_{mean}$ represents the mean of the difference of the attenuation between the signal generated by a best serving replacement cell after the deactivation of the candidate cell site, and the strongest interfering signal, and
p and (1−p) are weighting factors associated with the $\Delta PW_{\%}$ and $\Delta PW_{mean}$ parameters, respectively, where $0 \leq p \leq 1$.

According to an embodiment, the method 200 comprises, based on the estimated radio transmission parameter(s), selecting, for the cellular communication equipment associated with the replacement cells, respective replacement cell configurations (action node 225).

According to an embodiment, among the replacement cell configurations for which the radio transmission parameter(s) have been estimated, the replacement cell configurations being selected comprise the configurations that optimize the cost function.

Optimization of the cost function may for example involve minimization or maximization of the cost function, as the case may be.

Just as an example, when the cost function based on the signal to interference plus noise ratio estimates is considered, optimization of the cost function means minimization of the signal to interference plus noise ratio within the target geographic area covered only by the selected replacement cells (i.e., with the candidate cells being deactivated).

Just as another example, when the cost function based on the transmission power estimates is considered, optimization of the cost function means maximization of the overlapping of the radio coverage provided by the selected replacement cells with respect to the radio coverage provided by the candidate cells, i.e. maximization of the potential interference within the target geographic area.

According to an embodiment, the method 200 comprises setting the selected replacement cell configurations, i.e. setting each cellular communication equipment associated with the replacement cells at the respective selected replacement cell configuration (action node 230).

According to an embodiment, the setting of the selected replacement cell configurations (or of at least a subset thereof) is performed through the SON functionalities of the cellular communication system 100. According to an embodiment, the setting the selected replacement cell configurations (or of at least a subset thereof) is performed by the SON module 125, e.g. through a proper SON command.

According to an embodiment, the setting of the selected replacement cell configurations is performed while keeping unchanged current configurations of the cellular communication equipment associated with the candidate cells (hereinafter, candidate cell configurations) that are currently in use. In other words, according to an embodiment, the setting of the selected replacement cell configurations is performed while keeping unchanged the current candidate cell configurations (i.e., without that the candidate cell configurations are affected by the setting of the replacement cell configurations).

According to an embodiment, keeping unchanged the current candidate cell configurations allows the candidate cell site to keep on disposing data traffic to/from user equipment falling within the geographic area identified by the candidate cells (thus, without causing disservices to the users), while allowing a monitoring by the candidate cell site of an actual impact of the replacement cell configurations before decreeing the deactivation of the candidate cell site (as discussed here below). However, embodiments are not excluded in which monitoring is performed by the candidate cell site upon being set at a different (e.g., dedicated) candidate cell configuration, whereby the candidate cell site set at the dedicated candidate cell configuration is allowed to keep on disposing data traffic to/from user equipment falling within the geographic area identified by the candidate cells.

According to an embodiment, the method 200 comprises causing the candidate cells to monitor the radio transmission parameter(s) in the target geographic area (action node 235). According to an embodiment, the monitored radio transmission parameter(s) provide an indication of the actual impact that the replacement cells set at the replacement cell configurations have on quality of service in the target geographic area.

According to an embodiment, the radio transmission parameter(s) (or, analogously, the actual impact of the replacement cell configurations) are measured for a (e.g., predetermined) monitoring time period, for example a monitoring time period of the order of one or more days (such as 3 days).

According to an embodiment, measurements of the radio transmission parameter(s) are performed based on procedure and/or event traces collected by network elements of the cellular communication system 100.

According to procedure and/or event traces, for each user device UD connected to the cellular communication system 100, procedures and/or events (including, but are not limited to, voice call, data call, and related signalling procedures) are traced to allow periodically detecting signal levels associated with the respective serving cell as well as with cells adjacent thereto.

According to an embodiment, the traced procedures and/or events are geo-localized traced procedures and/or events.

According to an embodiment, geo-localizations of the traced procedures and/or events is achieved by means of trace information (i.e., information already included in the procedure and/or event traces) and/or by means of dedicated information (i.e., information not included in the procedure and/or event traces).

Example of trace information includes, but is not limited to, "Timing Advance" information (e.g., if the cellular communication system 100 is a LTE/LTE-Advanced cellular communication system), "Angle of Arrival" information (e.g., if the cellular communication system 100 is a 5G cellular communication system), and radio frequency (RF) signal strength of broadcasting signaling channels.

Example of dedicated information includes, but is not limited to, "*Angle of Arrival*" information and "*Global Navigation Satellite System*" (*GNSS*)/"*Assisted Global Navigation Satellite System*" (A-GNSS) information.

According to an embodiment, measurements of the radio transmission parameter(s) are performed, additionally or alternatively to procedure and/or event traces, based on radio measurements reported by the user devices UD through "Minimization of Drive Test" (MDT) functionality.

Examples of radio measurements include, but are not limited to, RSRP ("*Received Signal Received Power*"), RSRQ ("*Received Signal Received Quality*"), RSCP ("*Received Signal Code Power*"), "*Pilot Chip Energy to Interference Power Spectral Density*", "*Data Volume*", scheduled IP throughput, packet delay, packet loss rate, RTT ("*Round Trip Time*") and RXTX_TIMEDIFF measurements.

According to an embodiment, the radio measurements reported by the user devices UD are combined with positioning information. Positioning information may for example be provided by the user devices UD (e.g., by exploiting GPS and/or GNSS/A-GNSS functionalities thereof) and/or computed by the cellular communication system 100 (e.g., by the core network 120) based on the radio measurements. Examples of positioning information computed by the cellular communication system 100 include, but are not limited to, ranging measurements based on localization signals emitted by any properly configured cellular communication equipment.

According to an embodiment, in order to mitigate (e.g., reduce or cancel) interference between the candidate cells and the replacement cells that would originate due to the overlapping coverage areas resulting from the concurrent operation of the candidate cells and of the replacement cells during the monitoring time period, one or more inter-cell interference mitigation techniques may be implemented. According to an embodiment, such inter-cell interference mitigation techniques are implemented at radio resource scheduling level, for example at a network scheduler (not shown) of the cellular communication system 100.

An example of inter-cell interference mitigation technique comprises the ICIC ("*Inter Cell Interference Control*") technique disclosed in 3GPP TS 25913 and in 3GPP TS 36.423.

Another example of inter-cell interference mitigation technique may be based on frequency sub-band segregation technique, in which case a frequency sub-band may be assigned only to the candidate cells.

According to an embodiment, a comparison is performed at decision node 240 between the monitored radio transmission parameter(s) and the corresponding estimated radio transmission parameter(s). If, as a result of such a comparison, the monitored radio transmission parameter(s) approach the corresponding estimated radio transmission parameter(s) at least by a predefined amount (exit branch Y of decision node 240), which means that the replacement cells are capable of replacing the candidate cells while ensuring substantially the same estimated quality of service, then the candidate cell site is deactivated (action node 245).

According to an embodiment, cell site deactivation (action node 245) is performed by the SON module 125, e.g. through a proper SON command.

In the exemplary considered embodiment in which the radio transmission parameter(s) are used to determine a value of a respective cost function (such as the cost function based on the signal to interference plus noise ratio or the cost function based on transmission powers), the comparison at action node 240 may comprise a comparison between the values taken by the cost function based on the estimated radio transmission parameter(s) and the values taken by the same cost function based on the measured radio transmission parameter(s).

Considering for example the signal to interference plus noise ratio as measured radio transmission parameter, the measured signal to interference plus noise ratio would be the ratio between the signal power associated with a second-best replacement cell with respect to the candidate cell and the sum of the interfering signals with respect to the second-best of the other replacement cells (the candidate cells being preferably excluded from the calculation, both when they are serving cells and when they are interfering cells).

According to an embodiment, if the monitored radio transmission parameter(s) do not approach the corresponding estimated radio transmission parameter(s) at least by the predefined amount (exit branch N of decision node 240), which means that the replacement cells are not capable of replacing the candidate cells while ensuring substantially the same estimated quality of service, then the candidate cell site $105_i$ is not deactivated. According to an embodiment, if the monitored radio transmission parameter(s) do not approach the corresponding estimated radio transmission parameter(s) at least by the predefined amount, different (new) replacement cell configurations are determined (action node 225), whereby the method steps at nodes 230-240 are repeated as such based on these different replacement cell configurations (this is conceptually illustrated in the figure by loop connection between exit branch N of the decision node 240 and the action node 225).

According to an embodiment, the different (new) replacement cell configurations are determined based on one or more optimization algorithms, including (but not limited to) artificial intelligence algorithms.

Additionally or alternatively, such optimization algorithm(s) may be used when, as a result of the comparison performed at decision node 240, it is ascertained that the replacement cells are capable of replacing the candidate cells while ensuring substantially the same estimated quality of service. Therefore, in this embodiment, although the monitored radio transmission parameter(s) approach the corresponding estimated radio transmission parameter(s) at least by the predefined amount (exit branch Y of the decision node 240), optimization of the performance of the replacement cells in the target geographic area is still performed (e.g., by fine adjusting of the antenna parameter(s)).

Therefore, thanks to the monitoring function of the candidate cell site, deactivation of the candidate cell site is decreed only upon ascertaining that the selected replacement cells, properly reconfigured, are actually capable of replacing the candidate cells in delivering services (i.e., disposing traffic load), without generating radio coverage holes in the cellular network.

According to an embodiment, not shown, after a predetermined number of repetitions of the method steps at nodes 225-240 have been performed, and no deactivation of the candidate cell site $105_i$ has still occurred, the method 200 may be performed as such for a different candidate cell site $105_j$.

Although in the foregoing the deactivation of a cell site (i.e. the complete deactivation of a cell cite, namely the deactivation of all the cells associated therewith) has been considered as a preferred embodiment of the present invention, the principles of the present invention equivalently apply to a partial deactivation of a cell site (in which case the method for deactivating a cell site may be generalized to a method for at least partially deactivating a cell site).

According to an embodiment, when considering the partial deactivation of a cell site, the candidate cell site may be determined as the cell site associated with at least one candidate cell to be deactivated, and the at least one candidate cell to be deactivated may be one or more cells, among the plurality of cells associated with the candidate cell site, with a load factor below a threshold load factor.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the cellular communication system has a different structure or comprises equivalent components, or it has other operating features. In any case, any component or module thereof may be separated into several elements, or two or more components or modules may be combined into a single element; in addition, each component or module may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to a LTE/LTE-Advanced and 5G cellular communication systems, it should be understood that it is not in the intentions of the Applicant to be limited to the implementation of any particular cellular or wireless communication system architecture or protocol. In this respect, it is also possible to provide that, with suitable simple modifications, the proposed method for safely deactivating a cell site may be applied to any other cellular or wireless communication systems (e.g., 3G cellular communications systems).

The invention claimed is:

1. A method for managing a cellular communication system, wherein the cellular communication system comprises a plurality of cell sites each one associated with a plurality of cells, each cell identifying a respective radio coverage geographic area, and wherein each cell site comprises a cellular communication equipment associated with the plurality of cells of said cell site, the method comprising:

determining, among said plurality of cell sites, a candidate cell site to be at least partially deactivated, said candidate cell site being a cell site associated with at least one candidate cell to be deactivated, wherein the at least one candidate cell comprises at least one cell of the plurality of cells associated with the candidate cell site with a load factor below a threshold load factor;

selecting, among the plurality of cells associated with the plurality of cell sites other than the candidate cell site, replacement cells to replace the at least one candidate cell upon deactivation thereof, the replacement cells being adjacent to the at least one candidate cell;

determining a target geographic area, the target geographic area enclosing at least the radio coverage geographic areas identified by the at least one candidate cell and the radio coverage geographic areas identified by the replacement cells;

estimating at least one radio transmission parameter in the target geographic area as a function of a cell configuration of each cellular communication equipment associated with the replacement cells based on a simulation of at least partial deactivation of the candidate cell site and at least one replacement cell configuration in the target geographic area;

selecting respective replacement cell configurations based on said estimated at least one radio transmission parameter for the cellular communication equipment associated with the adjacent replacement cells;

setting each cellular communication equipment associated with the adjacent replacement cells at the respective replacement cell configuration;

monitoring, with the at least one candidate cell, said at least one radio transmission parameter in the target geographic area; and if the monitored at least one radio transmission parameter approaches at least by a predefined amount the estimated at least one radio transmission parameter for the respective replacement cell configurations, deactivating at least partially the candidate cell site by deactivating the at least one candidate cell of said candidate cell site.

2. The method according to claim 1, wherein the deactivating at least partially the candidate cell site further comprises causing the at least one candidate cell to monitor said at least one radio transmission parameter in the target geographic area while keeping on disposing data traffic to/from user equipment within the radio coverage geographic area identified by the at least one candidate cell.

3. The method according to claim 1, wherein the setting each cellular communication equipment and the monitoring said at least one radio transmission parameter are performed while keeping unchanged a current configuration of the cellular communication equipment associated with the at least one candidate cell.

4. The method according to claim 2, wherein the monitoring said at least one radio transmission parameter further comprises mitigating inter-cell interference between the at least one candidate cell and the replacement cells.

5. The method according to claim 1, further comprising, if the monitored at least one radio transmission parameter does not approach at least by the predefined amount the at least one radio transmission parameter estimated for the respective replacement cell configurations, repeating the selecting respective replacement cell configurations, the setting each cellular communication equipment, the monitoring said at least one radio transmission parameter, and the deactivating at least partially the candidate cell site.

6. The method according to claim 1, wherein said at least one radio transmission parameter comprises:
- a signal to interference plus noise ratio, or
- a user throughput, or
- a transmission power of the cellular communication equipment associated with the at least one candidate cell and a transmission power of the cellular communication equipment associated with the replacement cells.

7. The method according to claim 6, wherein said at least one radio transmission parameter comprises:
- a predefined percentile of a cumulative distribution function of the signal to interference plus noise ratio associated with the replacement cells, or
- a predefined percentile of a cumulative distribution function of the user throughput associated with users within the replacement cells, or
- a predefined percentile of a cumulative distribution of the transmission power of the cellular communication equipment associated with the at least one candidate cell and a predefined percentile of cumulative distribution of the transmission power of the cellular communication equipment associated with the replacement cells.

8. The method according to claim 1, wherein the setting each cellular communication equipment is performed through self-organizing network functionalities of the cellular communication system.

9. The method according to claim 1, wherein the monitoring said at least one radio transmission parameter further comprises monitoring based on at least one of:
- procedure and/or event collected by network elements of the cellular communication system, and
- radio measurements reported through Minimization of Drive Test functionality by one or more user devices connected to the cellular communication system.

10. The method according to claim 1, wherein each cellular communication equipment comprises at least one antenna, and wherein the replacement cell configuration comprises at least one antenna parameter of the cellular communication equipment associated with the replacement cells, said at least one antenna parameter comprising at least one among transmitted power, antenna electrical tilt, gain and antenna radiation pattern of said at least one antenna.

11. The method according to claim 1, wherein the monitoring said at least one radio transmission parameter further comprises monitoring based on at least one of:
- geo-localized procedure and/or geo-localized event traces collected by network elements of the cellular communication system, and
- geo-localized radio measurements reported through Minimization of Drive Test functionality by one or more user devices connected to the cellular communication system.

* * * * *